(12) United States Patent
Rogers

(10) Patent No.: US 7,703,288 B2
(45) Date of Patent: Apr. 27, 2010

(54) FUEL NOZZLE HAVING SWIRLER-INTEGRATED RADIAL FUEL JET

(75) Inventor: Thomas John Chipman Rogers, San Diego, CA (US)

(73) Assignee: Solar Turbines Inc., San Diego, CA (US)

(*) Notice: Subject to any disclaimer, the term of this patent is extended or adjusted under 35 U.S.C. 154(b) by 815 days.

(21) Appl. No.: 11/239,375

(22) Filed: Sep. 30, 2005

(65) Prior Publication Data

US 2007/0074517 A1 Apr. 5, 2007

(51) Int. Cl.
*F23R 3/36* (2006.01)
*F23R 3/14* (2006.01)

(52) U.S. Cl. .............. 60/742; 60/748; 60/737; 239/400; 239/403

(58) Field of Classification Search ............ 60/737, 60/742, 746, 747, 748; 239/399, 400, 403, 239/405, 406, 431, 433, 434, 434.5; 431/9, 431/182–184

See application file for complete search history.

(56) References Cited

U.S. PATENT DOCUMENTS

| | | | |
|---|---|---|---|
| 3,682,390 A * | 8/1972 | Cheshire et al. ............ 60/748 |
| 3,930,369 A * | 1/1976 | Verdouw .................. 60/737 |
| 4,116,388 A * | 9/1978 | Trozzi .................... 239/406 |
| 5,151,477 A | 9/1992 | Oxenrider et al. |
| 5,251,447 A | 10/1993 | Joshi et al. |
| 5,303,554 A | 4/1994 | Faulkner |
| 5,373,693 A | 12/1994 | Zarzalis et al. |
| 5,435,126 A | 7/1995 | Beaudoin |
| 5,647,200 A | 7/1997 | Althaus |
| 5,680,766 A | 10/1997 | Joshi et al. |
| 5,813,232 A | 9/1998 | Razdan et al. |
| 5,826,423 A | 10/1998 | Lockyer et al. |
| 6,052,986 A | 4/2000 | Hoffmann et al. |
| 6,073,436 A | 6/2000 | Bell et al. |
| 6,141,967 A * | 11/2000 | Angel et al. ............. 60/748 |
| 6,205,764 B1 | 3/2001 | Hermann et al. |
| 6,216,466 B1 | 4/2001 | Alkabie |
| 6,438,961 B2 | 8/2002 | Tuthill et al. |
| 6,532,742 B2 | 3/2003 | Scarinci et al. |
| 6,609,376 B2 * | 8/2003 | Rokke .................... 60/748 |
| 6,655,145 B2 | 12/2003 | Boardman |

(Continued)

FOREIGN PATENT DOCUMENTS

EP 1239219 9/2002

OTHER PUBLICATIONS http://mvsolar.catcom/cda/layout?m=35442&x=7, Gas Turbine Overview; printed Sep. 27, 2005.

*Primary Examiner*—Ted Kim
(74) *Attorney, Agent, or Firm*—Finnegan, Henderson, Farabow, Garrett & Dunner; Andrew J. Ririe

(57) ABSTRACT

A fuel nozzle for a turbine engine is disclosed. The fuel nozzle has a common axis, a body portion disposed about the common axis, a barrel portion located radially outward from the body portion. The fuel nozzle also has at least one swirler vane disposed between the body portion and the barrel portion and a liquid fuel jet disposed within the at least one swirler vane. The at least one swirler vane is configured to radially redirect an axial flow of air. The liquid fuel jet is configured to inject liquid fuel in a radial direction relative to the common axis.

19 Claims, 2 Drawing Sheets

U.S. PATENT DOCUMENTS

| | | | |
|---|---|---|---|
| 6,684,641 B2 * | 2/2004 | Moriya et al. | 60/737 |
| 6,698,206 B2 | 3/2004 | Scarinci et al. | |
| 6,732,527 B2 | 5/2004 | Freeman et al. | |
| 6,820,411 B2 * | 11/2004 | Pederson et al. | 60/748 |
| 6,832,481 B2 | 12/2004 | Koenig et al. | |
| 7,367,798 B2 * | 5/2008 | Sarv | 431/185 |
| 7,377,036 B2 * | 5/2008 | Johnson et al. | 60/742 |
| 2004/0050056 A1 * | 3/2004 | Pederson et al. | 60/737 |
| 2004/0055308 A1 * | 3/2004 | Blomeyer | 60/737 |
| 2004/0142294 A1 * | 7/2004 | Niass et al. | 431/278 |

* cited by examiner

US 7,703,288 B2

FUEL NOZZLE HAVING SWIRLER-INTEGRATED RADIAL FUEL JET

TECHNICAL FIELD

The present disclosure relates generally to a fuel nozzle of a turbine engine, and more particularly, to a fuel nozzle having a swirler-integrated radial fuel jet.

BACKGROUND

Internal combustion engines, including diesel engines, gaseous-fueled engines, and other engines known in the art, may exhaust a complex mixture of air pollutants. The air pollutants may be composed of gaseous compounds, which may include nitrous oxides (NOx). Due to increased attention on the environment, exhaust emission standards have become more stringent, and the amount of NOx emitted to the atmosphere from an engine may be regulated depending on the type of engine, size of engine, and/or class of engine.

One method that has been implemented by turbine engine manufacturers to comply with the regulation of these emissions while maintaining high engine efficiency has been to design and produce turbine engines that generate an evenly distributed flame having a low flame temperature. One such method is described in U.S. Pat. No. 6,655,145 (the '145 patent) issued to Boardman on Dec. 2, 2003. The '145 patent describes a turbine engine having a fuel nozzle with a center body. A barrel portion is positioned radially distal from the center body. At least one swirler vane is positioned between the center body and the barrel portion to radially redirect incoming compressed air. A liquid fuel passage passes through the swirler vane, and a liquid fuel jet located on a surface of the swirler vane fluidly communicates with the passage to inject fuel axially into a combustion chamber of the turbine engine. As the compressed air flows through the swirler, the air mixes with the injected liquid fuel to produce a substantially homogenous air/fuel mixture that, when ignited, produces an evenly distributed flame having a low flame temperature.

Although the fuel nozzle of the '145 patent may improve air/fuel mixing and flame distribution, it may be insufficient and problematic. In particular, because the liquid fuel is axially injected, the radially-redirected air may transport some of the liquid fuel outward toward and onto the barrel portion before the liquid fuel is properly mixed and entrained within the compressed air. As a result, some of the fuel may collect on the barrel portion, form large droplets of fuel, and, when ignited, create high-temperature pockets of NOx-enriched exhaust. It is also possible for the fuel collected on the barrel to coke and create obstructions or blockages that reduce functionality of the fuel nozzle. In addition, this improper distribution and combustion of the liquid fuel could reduce operational efficiency of the turbine engine.

The disclosed fuel nozzle is directed to overcoming one or more of the problems set forth above.

SUMMARY OF THE INVENTION

A fuel nozzle may comprise a body portion disposed about an axis, a barrel portion located radially outward from the body portion so as to define an annular space between the body portion and the barrel portion, a plurality of swirler vanes located between the body portion and the barrel portion, a liquid fuel jet disposed within at least one swirler vane of the plurality of swirler vanes, the liquid fuel jet being configured to inject a liquid fuel from a liquid fuel gallery into the annular space in a radial direction relative to the common axis, and a gaseous fuel jet disposed on at least one swirler vane of the plurality of swirler vanes, the gaseous fuel jet being configured to inject a gaseous fuel from a gaseous fuel gallery into the annular space in an axial direction relative to the common axis, the gaseous fuel gallery being separate from, and fluidly uncoupled to, the liquid fuel gallery.

A method of mixing fuel and air within a turbine engine may comprise, compressing air in a compressor of the turbine engine, axially directing the compressed air towards a combustion chamber through a plurality of swirler vanes positioned in an annular space between a pilot fuel injector and a barrel housing, delivering a liquid fuel from a liquid fuel gallery to a liquid fuel jet positioned within at least one swirler vane of the plurality of swirler vanes, the at least one swirler vane also including a gaseous fuel jet that is fluidly coupled to a gaseous fuel manifold, the gaseous fuel gallery being separate from and fluidly uncoupled to the liquid fuel gallery, the gaseous fuel jet being configured to inject a gaseous fuel in an axial direction into the annular space, and injecting liquid fuel from the liquid fuel jet in a radial direction in the annular space.

A turbine engine may comprise a compressor section configured to pressurize inlet air, a combustion chamber configured to receive the compressed air, and a fuel nozzle configured to direct fuel into the combustion chamber, the fuel nozzle having a body portion disposed about an axis, a barrel portion located radially outward from the body portion so as to define an annular space between the body portion and the barrel portion, a plurality of swirler vanes disposed in the annular space, and a liquid fuel jet disposed within at least one swirler vane of the plurality of swirler vanes and configured to inject liquid fuel radially inward into the compressed air flowing through the annular space, wherein the liquid fuel jet includes a tubular member disposed within the at least one swirler vane, the tubular member being separated from an internal wall of the at least one swirler vane by an air gap.

DETAILED DESCRIPTION

Figure 1:
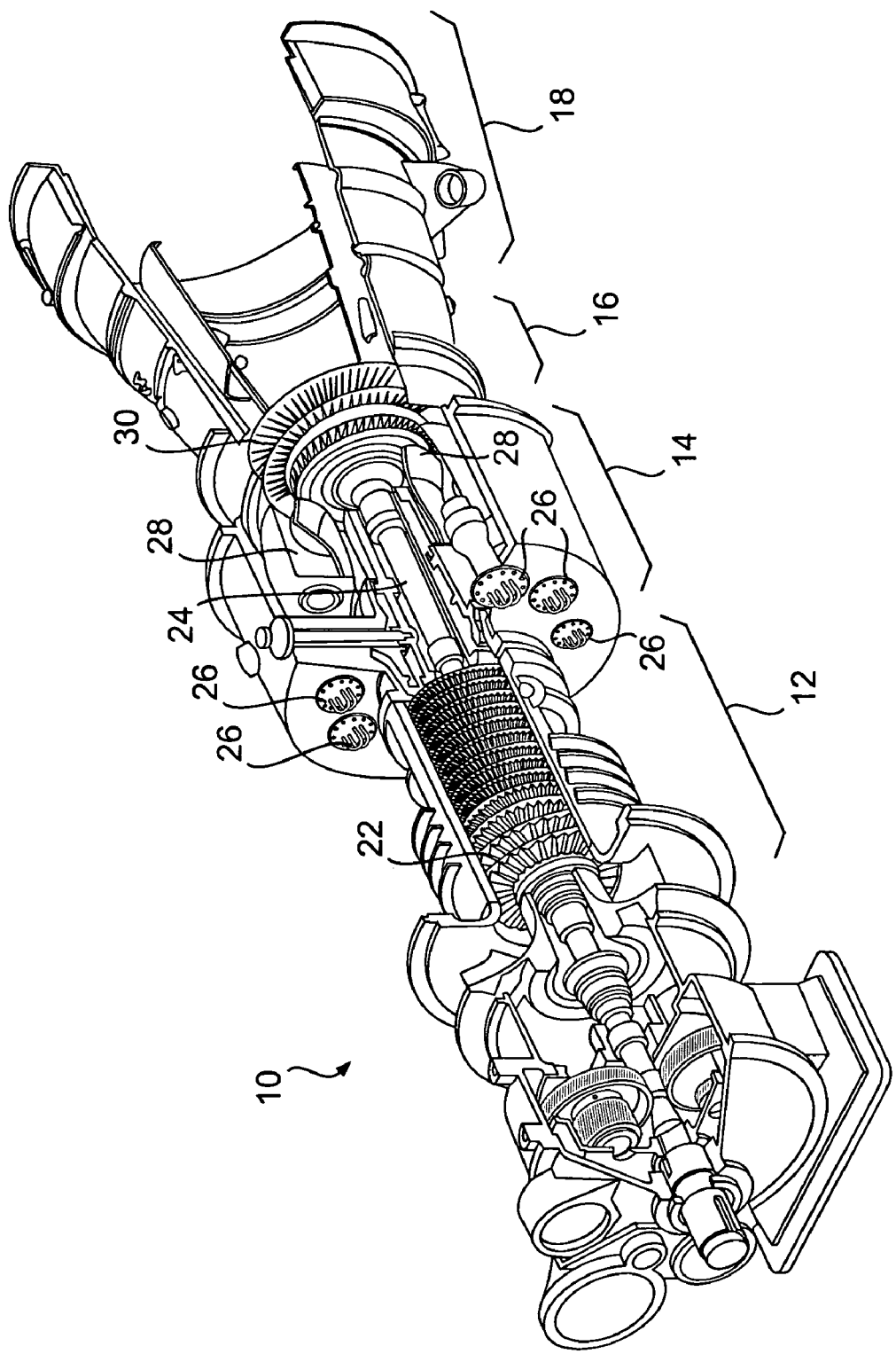
FIG. 1 is a cutaway-view illustration of an exemplary disclosed turbine engine.

FIG. 1 illustrates an exemplary turbine engine 10. Turbine engine 10 may be associated with a stationary or mobile work machine configured to accomplish a predetermined task. For example, turbine engine 10 may embody the primary power source of a generator set that produces an electrical power output or of a pumping mechanism that performs a fluid pumping operation. Turbine engine 10 may alternatively embody the prime mover of an earth-moving machine, a passenger vehicle, a marine vessel, or any other mobile machine known in the art. Turbine engine 10 may include a compressor section 12, a combustor section 14, a turbine section 16, and an exhaust section 18.

Compressor section 12 may include components rotatable to compress inlet air. Specifically, compressor section 12 may include a series of rotatable compressor blades 22 fixedly connected about a central shaft 24. As central shaft 24 is rotated, compressor blades 22 may draw air into turbine engine 10 and pressurize the air. This pressurized air may then be directed toward combustor section 14 for mixture with a liquid and/or gaseous fuel. It is contemplated that compressor section 12 may further include compressor blades (not shown) that are separate from central shaft 24 and remain stationary during operation of turbine engine 10.

Combustor section 14 may mix fuel with the compressed air from compressor section 12 and combust the mixture to create a mechanical work output. Specifically, combustor section 14 may include a plurality of fuel nozzles 26 annularly arranged about central shaft 24, and an annular combustion chamber 28 associated with fuel nozzles 26. Each fuel nozzle 26 may inject one or both of liquid and gaseous fuel into the flow of compressed air from compressor section 12 for ignition within combustion chamber 28. As the fuel/air mixture combusts, the heated molecules may expand and move at high speed into turbine section 16.

Figure 2A:
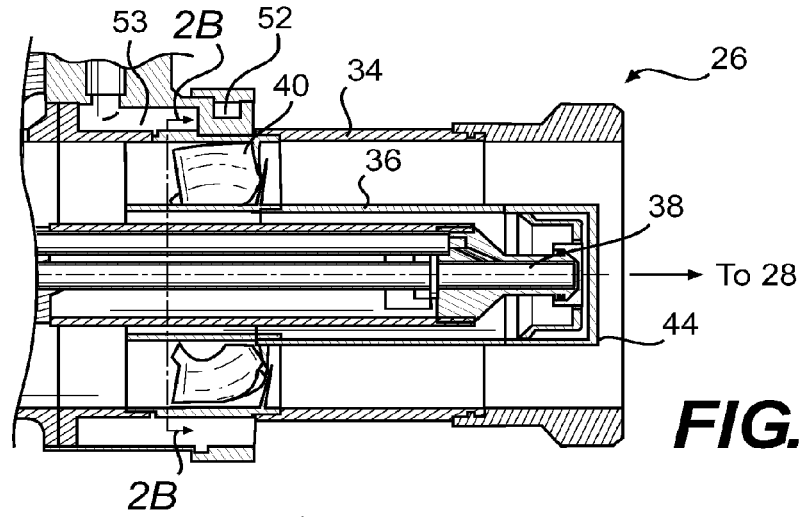
FIG. 2A is a cross-sectional illustration of an exemplary disclosed fuel nozzle for the turbine engine of FIG. 1.

As illustrated in the cross-section of FIG. 2A, each fuel nozzle 26 may include components that cooperate to inject the gaseous and liquid fuel into combustion chamber 28. Specifically, fuel nozzle 26 may include a barrel housing 34 having an inlet for receiving compressed air from compressor section 12 and an outlet for communication with combustion chamber 28, a central body 36, a pilot fuel injector 38, and a swirler 40. Central body 36 may be disposed radially inward of barrel housing 34 and aligned along a common axis 42. Pilot fuel injector 38 may be located within central body 36 and configured to inject a pilot stream of pressurized fuel through a tip end 44 of central body 36 into combustion chamber 28 to facilitate engine starting, idling, cold operation, and/or lean burn operations of turbine engine 10. Swirler 40 may be annularly disposed between barrel housing 34 and central body 36.

Figure 2B:
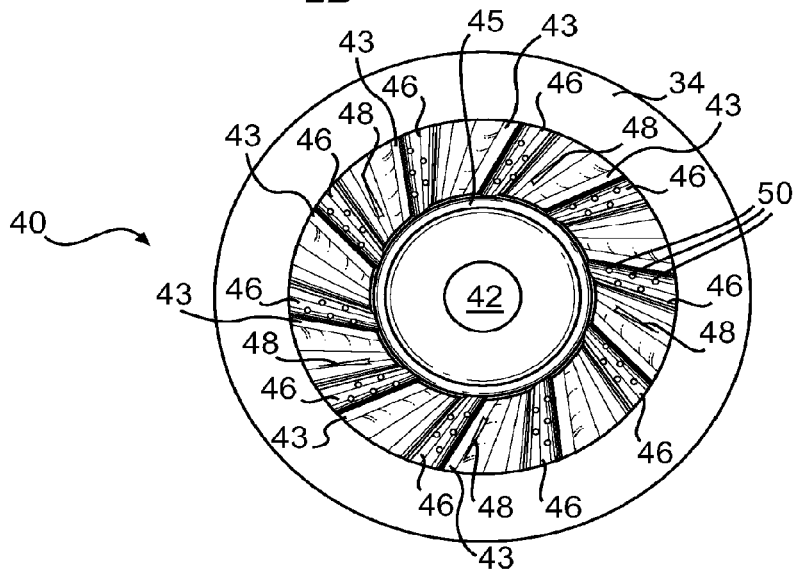
FIG. 2B is an end-view pictorial illustration of an exemplary disclosed swirler for the fuel nozzle of FIG. 2A.
Figure 2C:
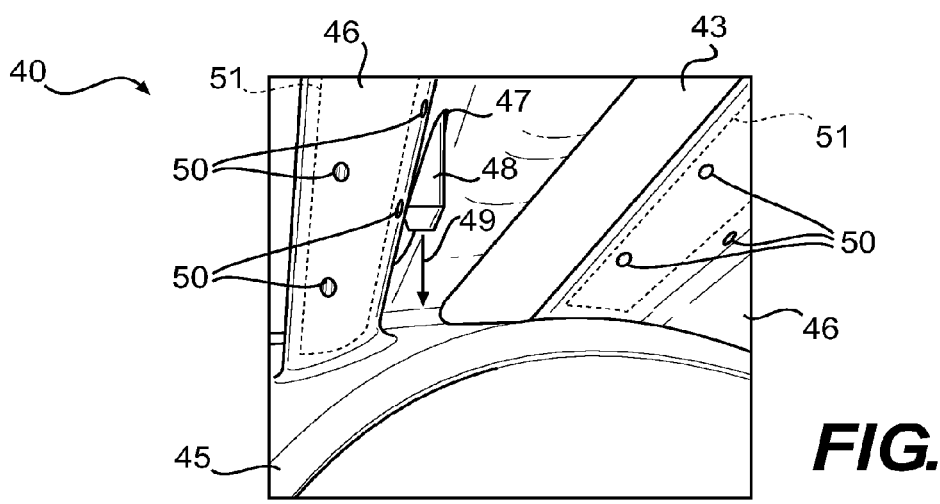
FIG. 2C is a close-up pictorial illustration of an exemplary disclosed liquid fuel jet disposed within the swirler of FIG. 2B.

As illustrated in FIGS. 2B and 2C, swirler 40 may be situated to radially redirect an axial flow of compressed air from compressor section 12. In particular, swirler 40 may embody an annulus 45 having a plurality of connected vanes 46 located within an axial flow path of the compressed air. As the compressed air contacts vanes 46, it may be diverted in a radial inward direction. In one example, each vane 46 may extend from barrel housing 34 radially inward toward a point offset from common axis 42. That is, each of vanes 46 may have a tangential component canted off the radius relative to common axis 42 to minimize the likelihood of voiding or flow separation along common axis 42 downstream of fuel nozzle 26. In addition, each of vanes 46 may be tilted relative to an orthogonal radial line (e.g., a radial line orthogonal to common axis 42) originating from common axis 42 and twisted along its radial axis to impose a force radially inward.

Vanes 46 may facilitate fuel injection and mixing within barrel housing 34. In particular, some or all of vanes 46 may each include a liquid fuel jet 48 and a plurality of gaseous fuel jets 50. Although, in the embodiment of FIG. 2B, alternate vanes 46 of swirler 40 are illustrated as including liquid fuel jets 48, it is contemplated that any number or configuration of vanes 46 may include liquid fuel jets 48.

As best illustrated in FIG. 2C, liquid fuel jets 48 may be configured to inject liquid fuel radially inward from vanes 46. Specifically, liquid fuel jets 48 may embody tubular members disposed within a shell of vanes 46 and extending from barrel housing 34 toward annulus 45. In one example, an air gap 47 may exist between an inner surface of vanes 46 and the outer surface of liquid fuel jets 48 to provide thermal insulation for the liquid fuel contained therein. It is contemplated, however, that air gap 47 may be omitted, if desired. It is further contemplated that liquid fuel jets 48 may alternatively embody passageways integrally formed within vanes 46. Liquid fuel jets 48 may receive liquid fuel such as, for example, no. 2 diesel from a liquid fuel gallery 52 which is supplied from a common manifold (not shown) located external of barrel housing 34 (referring to FIG. 2A) and inject the liquid fuel along the direction of arrow 49, radially inward toward annulus 45 during operation of turbine engine 10.

Gaseous fuel jets 50 may provide a constant mass flow of gaseous fuel such as, for example, natural gas, landfill gas, bio-gas, or any other suitable gaseous fuel to combustion chamber 28. In particular, gaseous fuel jets 50 may embody restrictive orifices situated along a leading edge of each vane 46. Each of gaseous fuel jets 50 may be in communication with a central fuel passageway 51 within the associated vane 46 to receive gaseous fuel from gaseous fuel gallery 53. The restriction at gaseous fuel jets 50 may be the greatest restriction within fuel nozzle 26, such that a continuous mass flow of gaseous fuel from gaseous fuel jets 50 may be ensured. The gaseous fuel may be injected from gaseous fuel jets 50 axially upstream against the flow of compressed air.

Combustion chamber 28 (referring to FIG. 1) may house the combustion process. In particular, combustion chamber 28 may be in fluid communication with each fuel nozzle 26 and may be configured to receive a substantially homogenous mixture of fuel and compressed air. The fuel/air mixture may be ignited and may fully combust within combustion chamber 28. As the fuel/air mixture combusts, hot expanding gases may exit combustion chamber 28 and enter turbine section 16.

Turbine section 16 may include components rotatable in response to the flow of expanding exhaust gases from combustor section 14. In particular, turbine section 16 may include a series of rotatable turbine rotor blades 30 fixedly connected to central shaft 24. As turbine rotor blades 30 are bombarded with high-energy molecules from combustor section 14, the expanding molecules may cause central shaft 24 to rotate, thereby converting combustion energy into useful rotational power. This rotational power may then be drawn from turbine engine 10 and used for a variety of purposes. In addition to powering various external devices, the rotation of turbine rotor blades 30 and central shaft 24 may drive the rotation of compressor blades 22.

Exhaust section 18 may direct the spent exhaust from combustor and turbine sections 14, 16 to the atmosphere. It is contemplated that exhaust section 18 may include one or more treatment devices configured to remove pollutants from the exhaust and/or attenuation devices configured to reduce the noise associated with turbine engine 10, if desired.

INDUSTRIAL APPLICABILITY

The disclosed fuel nozzle may be applicable to any turbine engine where a low temperature, well-distributed flame is desired. The disclosed fuel nozzle may provide the low temperature, well-distributed flame by injecting liquid fuel radially inward with a redirected radial flow of compressed air. The operation of fuel nozzle 26 will now be explained.

During operation of turbine engine 10, air may be drawn into turbine engine 10 and compressed via compressor section 12 (referring to FIG. 1). This compressed air may then be axially directed into combustor section 14 and against vanes 46 of swirler 40, where the flow may be redirected radially inward in a spiraling manner. As the flow of compressed air is turned to flow radially inward, liquid fuel may be injected from liquid fuel jets 48 radially inward with the flow of compressed air for mixing prior to combustion. Alternatively or additionally, gaseous fuel may be injected axially upstream of swirler 40 against the flow of compressed air for mixing prior to combustion. As the substantially homogenous mixture of fuel and air enters combustion chamber 28, it may ignite and fully combust. The hot expanding exhaust gases may then be expelled into turbine section 16, where the molecular energy may be converted to rotational energy of turbine rotor blades 30 and central shaft 24.

Several advantages over the prior art may be associated with fuel nozzle 26 of turbine engine 10. Specifically, because the liquid fuel, during injection, may include radially inward-directed momentum, it may be more difficult for the spiraling motion of the swirling air to fling the liquid fuel the full distance into contact with the internal wall of barrel housing 34 before the liquid fuel is vaporized or fully entrained within the compressed air. For this reason, less liquid fuel may be deposited on the internal walls of barrel housing 34, resulting in consistent operation and prolonged component life of fuel nozzle 26. In addition, because the radially redirected flow of compressed air moves inward toward central axis 42 rather than outward toward barrel housing 34, voiding or flow separation near central axis 42 may be less likely to occur.

It will be apparent to those skilled in the art that various modifications and variations can be made to the disclosed fuel nozzle. Other embodiments will be apparent to those skilled in the art from consideration of the specification and practice of the disclosed fuel nozzle. It is intended that the specification and examples be considered as exemplary only, with a true scope being indicated by the following claims and their equivalents.

What is claimed is:

1. A fuel nozzle, comprising:
    an axis;
    a body portion disposed about the axis;
    a barrel portion located radially outward from the body portion so as to define an annular space between the body portion and the barrel portion;
    a plurality of swirler vanes located between the body portion and the barrel portion;
    a liquid fuel jet disposed within at least one swirler vane of the plurality of swirler vanes, the liquid fuel jet being configured to inject a liquid fuel from a liquid fuel gallery into the annular space in a radial direction relative to the common axis; and
    a gaseous fuel jet disposed on at least one swirler vane of the plurality of swirler vanes, the gaseous fuel jet being configured to inject a gaseous fuel from a gaseous fuel gallery into the annular space in an axial direction relative to the common axis, the gaseous fuel gallery being separate from, and fluidly uncoupled to, the liquid fuel gallery.

2. The fuel nozzle of claim 1, wherein the liquid fuel jet is configured to inject liquid fuel towards the axis.

3. The fuel nozzle of claim 2, wherein the plurality of swirler vanes are configured to allow compressed air to flow through the annular space.

4. The fuel nozzle of claim 1, wherein the liquid fuel jet includes a tubular member extending through the at least one swirler vane from the barrel portion towards the body portion, the tubular member being separated from an internal wall of the at least one swirler vane by an air gap.

5. The fuel nozzle of claim 1, wherein the gaseous fuel jet includes a plurality of gaseous fuel jets disposed on the at least one swirler vane.

6. The fuel nozzle of claim 5, wherein each of the plurality of gaseous fuel jets includes a restrictive orifice located at a surface of the at least one swirler vane.

7. The fuel nozzle of claim 5, wherein the plurality of gaseous fuel jets are positioned on an upstream side of the at least one swirler vane, and the plurality of gaseous fuel jets are configured to inject gaseous fuel against a flow of compressed air flowing in the annular space.

8. The fuel nozzle of claim 1, wherein:
    the plurality of swirler vanes includes a first swirler vane and a second swirler vane, the first swirler vane including both the liquid fuel jet and the gaseous fuel jet and the second swirler vane including the gaseous fuel jet and not including the liquid fuel jet.

9. The fuel nozzle of claim 1, wherein the gaseous fuel jet is positioned on an upstream side of the at least one swirler vane and configured to inject gaseous fuel against a flow of compressed air in the annular space.

10. The fuel nozzle of claim 1, wherein the gaseous fuel jet is included in all swirler vanes of the plurality of swirler vanes and the liquid fuel jet is included in every alternate swirler vane of the plurality of swirler vanes.

11. The fuel nozzle of claim 1, wherein the liquid fuel jet is oriented so as to inject liquid fuel into the annular space in a direction that is substantially perpendicular to a direction of injection of gaseous fuel through the gaseous fuel jet.

12. A method of mixing fuel and air within a turbine engine, comprising:
    compressing air in a compressor of the turbine engine;
    axially directing the compressed air towards a combustion chamber through a plurality of swirler vanes positioned in an annular space between a pilot fuel injector and a barrel housing;
    delivering a liquid fuel from a liquid fuel gallery to a liquid fuel jet positioned within at least one swirler vane of the plurality of swirler vanes, the at least one swirler vane also including a gaseous fuel jet that is fluidly coupled to a gaseous fuel gallery, the gaseous fuel gallery being separate from and fluidly uncoupled to the liquid fuel gallery, the gaseous fuel jet being configured to inject a gaseous fuel in an axial direction into the annular space; and
    injecting liquid fuel from the liquid fuel jet in a radial direction in the annular space.

13. The method of claim 12, wherein injecting the liquid fuel includes injecting the liquid fuel radially inwards.

14. The method of claim 12, wherein delivering the liquid fuel includes directing pressurized fuel radially inward through a tubular member extending through the at least one swirler vane from the barrel housing towards the pilot fuel injector, the tubular member being separated from an internal wall of the at least one swirler vane by an air gap.

15. The method of claim 12, wherein the gaseous fuel jet is configured to inject gaseous fuel against a flow of compressed air in the annular space.

16. A turbine engine, comprising:
    a compressor section configured to pressurize inlet air;
    a combustion chamber configured to receive the compressed air; and
    a fuel nozzle configured to direct fuel into the combustion chamber, the fuel nozzle having;
    an axis;
    a body portion disposed about the axis;
    a barrel portion located radially outward from the body portion so as to define an annular space between the body portion and the barrel portion;
    a plurality of swirler vanes disposed in the annular space; and
    a liquid fuel jet disposed within at least one swirler vane of the plurality of swirler vanes and configured to inject liquid fuel radially inward into the compressed air flowing through the annular space, wherein the liquid fuel jet includes a tubular member disposed within the at least one swirler vane, the tubular member being separated from an internal wall of the at least one swirler vane by an air gap.

17. The turbine engine of claim 16, wherein each swirler vane of the plurality of swirler vanes extends from the barrel portion radially inward toward the body portion.

18. The fuel nozzle of claim 16, further including a plurality of gaseous fuel jets disposed on the at least one swirler vane, each gaseous fuel jet of the plurality of gaseous fuel jets being configured to inject gaseous fuel into the annular space in an axial direction with respect to the common axis.

19. The turbine engine of claim 16, wherein at least one gaseous fuel jet of the plurality of gaseous fuel jets is positioned on an upstream side of the swirler vane to inject gaseous fuel against a flow of compressed air in the annular space.

* * * * *

UNITED STATES PATENT AND TRADEMARK OFFICE
CERTIFICATE OF CORRECTION

| | | |
|---|---|---|
| PATENT NO. | : 7,703,288 B2 | Page 1 of 1 |
| APPLICATION NO. | : 11/239375 | |
| DATED | : April 27, 2010 | |
| INVENTOR(S) | : Thomas John Chipman Rogers et al. | |

It is certified that error appears in the above-identified patent and that said Letters Patent is hereby corrected as shown below:

On the Title Page, Item (75)
Three inventors should be listed on the patent:
1. Thomas John Chipman Rogers
2. Chris Twardochleb
3. Hongyu Wang Signed and Sealed this
Nineteenth Day of July, 2011

David J. Kappos
*Director of the United States Patent and Trademark Office*